United States Patent
Lee et al.

(10) Patent No.: US 7,274,825 B1
(45) Date of Patent: Sep. 25, 2007

(54) IMAGE MATCHING USING PIXEL-DEPTH REDUCTION BEFORE IMAGE COMPARISON

(75) Inventors: Ruby B. Lee, Princeton, NJ (US); Dale Morris, Steamboaat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 10/403,754

(22) Filed: Mar. 31, 2003
(Under 37 CFR 1.47)

(51) Int. Cl.
*G06K 9/36* (2006.01)
(52) U.S. Cl. .................................. 382/239; 382/236
(58) Field of Classification Search ............... 382/251, 382/236
See application file for complete search history.

(56) References Cited

U.S. PATENT DOCUMENTS 5,488,618 A * 1/1996 Kondo et al. ............... 714/819
6,058,210 A * 5/2000 de Queiroz et al. ........ 382/232
6,058,217 A * 5/2000 Kondo ....................... 382/251
2002/0146073 A1 * 10/2002 Clark et al. ............ 375/240.26

* cited by examiner

*Primary Examiner*—Joseph Mancuso
*Assistant Examiner*—Hadi Akhavannik

(57) ABSTRACT

A block-matching method reduces pixel depth prior to match evaluation to drastically reduce the computations required intensive block-matching applications such motion estimation for video compression. Pixel-depth reduction is achieved by analyzing incorporating images to determine how to reduce pixel depth so as to retain information useful for block matching. Original pixel values (e.g., 8-bit), are compressed to lower-depth (e.g., e.g., 1-bit or 1.6-bit) pixel values. The resulting converted blocks are XORed to yield a comparison image. The 1s in the comparison image are tallied to provide a match measure. In the image analysis, the original images can be subsampled and averages can be computed based on the subsample pixels to reduce computational overhead.

15 Claims, 4 Drawing Sheets

IMAGE MATCHING USING PIXEL-DEPTH REDUCTION BEFORE IMAGE COMPARISON

BACKGROUND OF THE INVENTION

The present invention relates to digital image processing and, more particularly, to evaluating matches between digital images. The invention provides for high throughput motion estimation for video compression by providing a high-speed image-block-match function.

Video (especially with, but also without, audio) can be an engaging and effective form of communication. Video is typically stored as a series of still images referred to as "frames". Motion and other forms of change can be represented as small changes from frame to frame as the frames are presented in rapid succession. Video can be analog or digital, with the trend being toward digital due to the increase in digital processing capability and the resistance of digital information to degradation as it is communicated.

Digital video can require huge amounts of data for storage and bandwidth for communication. For example, a digital image is typically described as an array of color dots, i.e., picture elements ("pixels") each with an associated "color" or intensity described numerically. The number of pixels in an image can vary from hundreds to millions and beyond, with each pixel being able to assume any one of a range of values. The number of values available for characterizing a pixel can range from two to trillions; in the binary code used by computers and computer networks, the typical range is from 1 bit to 32 bits.

In view of the typically small changes from frame to frame, there is a lot of redundancy in video data. Accordingly, many video compression schemes seek to compress video data in part by exploiting inter-frame redundancy to reduce storage and bandwidth requirements. For example, two successive frames will have some corresponding pixel ("picture elements") positions at which there is change and some pixel positions in which there is no change. Instead of describing the entire second frame pixel by pixel, only the changed pixels need be described in detail—the pixels that are unchanged can simply be indicated as "unchanged". More generally, there may be slight changes in background pixels from frame to frame; these changes can be efficiently encoded as changes from the first frame as opposed to absolute values. Typically, this "inter-frame compression" results in a considerable reduction in the amount of data required to represent successive frames.

On the other hand, identifying unchanged pixel positions does not provide optimal compression in many situations. For example, consider the case where a video camera is panned 1-pixel to the left while videoing a static scene so that the scene appears (to the person viewing the video) to move 1-pixel to the right. Even though two successive frames will look very similar, the correspondence on a position-by-position basis may not be high. A similar problem arises as a large object moves against a static background: the redundancy associated with the background can be reduced on a position-by-position basis, but the redundancy of the object as it moves is not exploited.

Some prevalent compression schemes, e.g., MPEG, encode "motion vectors" to address inter-frame motion. A motion vector can be used to map one block of pixel positions in a first "reference" frame to a second block of pixel positions (displaced from the first set) in a second "predicted" frame. Thus, a block of pixels in the predicted frame can be described in terms of its differences from a block in the reference frame identified by the motion vector. For example, the motion vector can be used to indicate that the pixels in a given block of the predicted frame are being compared to pixels in a block one pixel up and two to the left in the reference frame. The effectiveness of compression schemes that use motion estimation is well established; in fact, the popular DVD ("digital versatile disk") compression scheme (a form of MPEG2) uses motion detection to put hours of high-quality video on a 5-inch disk.

Identifying motion vectors can be a challenge. Translating a human visual ability for identifying motion into an algorithm that can be used on a computer is problematic, especially when the identification must be performed in real time (or at least at high speeds). Computers typically identify motion vectors by comparing blocks of pixels across frames. For example, each 16×16-pixel block in a "predicted" frame can be compared with many such blocks in another "reference" frame to find a best match. Blocks can be matched by calculating the sum of the absolute values of the differences of the pixel values at corresponding pixel positions within the respective blocks. The pair of blocks with the lowest sum represents the best match, the difference in positions of the best-matched blocks determines the motion vector. Note that in some contexts, the 16×16-pixel blocks typically used for motion detection are referred to as "macroblocks" to distinguish them from 8×8-pixel blocks used by DCT (discrete cosine transformations) transformations for intra-frame compression.

For example, consider two color video frames in which luminance (brightness) and chrominance (hue) are separately encoded. In such cases, motion estimation is typically performed using only the luminance data. Typically, 8-bits are used to distinguish 256 levels of luminance. In such a case, a 64-bit register can store luminance data for eight of the 256 pixels of a 16×16 block; thirty-two 64-bit registers are required to represent a full 16×16-pixel block, and a pair of such blocks fills sixty-four 64-bit registers. Pairs of 64-bit values can be compared using parallel subword operations. For example, PSAD "parallel sum of the absolute differences" yields a single 16-bit value for each pair of 64-bit operands. There are thirty-two such results, which can be added or accumulated, e.g., using ADD or accumulate instructions. In all, about sixty-three instructions are required to evaluate each pair of blocks. The number of matches to be evaluated varies by orders of magnitude, depending on several factors, but there can easily be millions to evaluate for a pair of frames. In any event, the block matching function severely taxes encoding throughput. What is needed is an approach to reducing the processing burden imposed by motion estimation.

SUMMARY OF THE INVENTION

The present invention provides a method of evaluating a match between image blocks (or, more generally, images) in which pixel depth is reduced prior to evaluating the match between images. Generally, the pixel reduction can be divided into two steps: image analysis and the actual conversion. Likewise, the evaluation can be divided into two steps, comparison of the reduced-depth images and evaluation of the resulting comparison image to provide the desired image-match measure. In view of the contemplated application for motion estimation, much of the following text refers to matching blocks of video frames, although the invention is also applicable to evaluating full image and non-block sub-image matching. Also, the conceptual method steps of the invention can be performed one after the other or concurrently by combining or pipelining operations.

The image analysis step provides information used in pixel-depth reduction to allow the image data to be significantly compressed, while retaining pattern information useful for evaluating block matches. If, for example, pixel-depth reduction were achieved simply by dropping the least-significant luminance bits, many relatively dark or relatively light blocks would appear uniform so that pattern details useful for identifying matches would be lost. The image analysis can, for example, determine an average luminance value to which pixels are to be compared so that patterns of relative brightness and darkness can be compared between blocks regardless of the overall luminance of the blocks.

The image analysis looks at pixel values for the frames containing the blocks being compared. Depending on the embodiment, the image analysis for a given block can be based in part on one or more of the following: 1) pixels in the given block; 2) pixels outside the given block but in the same frame; and 3) pixels in the other frame involved in the comparison.

The invention provides that the image analysis yield data that is either 1) computed once for a block and applied uniformly to all pixels in that block; 2) computed for each pixel in a block, and applied to that pixel; or 3) computed for each sub-block of a block and applied to that sub-block. An example of the first case is comparing each pixel value of a given block with the average pixel value for the given block; an example of the second case is comparing each pixel value with an average for a block (usually not the given block) having that pixel at or near its center; and an example of the third case is comparing pixels of a sub-block with an average for a block having the sub-block near its center. In selecting among the wide range of possibilities, consideration is given to the associated computational burden on the one hand, and any reduction of the accuracy of the resulting block match function on the other.

Pixel-depth reduction reduces pixel depth by at least one-half. For example, 8-bit-per-pixel data can be reduced to 4-bit-, 3-bit-, 2-bit-, or 1-bit-per-pixel data. In an example of luminance data reduced to 1-bit depth, a "1" can be assigned to each pixel with a luminance value greater than the block average, while a 0 is assigned to the other pixels of the block. In an example of reduction to 2-bits-per-pixel, the pixels in a block can be grouped roughly equally into four luminance ranges and assigned 2-bit values accordingly. Likewise, pixels can be subdivided into more groups according to luminance values and 3- or more-bit values assigned accordingly.

The compressed pixel depth can be an integer or non-integer, either less than or greater than unity. For example, pixels can be grouped into 2×2 super-pixels so that all pixels of a super-pixel are converted to the same one-bit value. One 1-bit value per four pixels yields a fractional average pixel depth of 0.25-bits-per-pixel. For another example, the pixel values for a block can be trisected (e.g., into a low range, middle range, and high range) so that the resulting trinates are respectively assigned values 0, 1 or 2. In this case, the compressed pixel depth is between 1- and 2-bits per pixel, roughly 1.6-bits per pixel.

Block comparison involves combining blocks to yield a comparison image that indicates matching, typically on a pixel-by-pixel basis. In the prior art, the absolute value of the difference in luminance can be determined on a pixel-by-pixel basis to obtain a combined image. While allowing for this approach, the invention also provides for a bit-wise combination of images so that the carrying/borrowing involved in subtraction is avoided. For example, the reduced-depth values can simply be XORed to yield a comparison image. The invention also provides for comparison on a super-pixel or other alternative to pixel-by-pixel comparisons.

Evaluation of the comparison image involves assigning a value to the comparison image as a function of its content; this value then serves as the desired match measure. In the prior art, a match measure is achieved by summing pixel values in the comparison image. While also providing for this, the invention also provides for simply tallying (counting) selected bit values associated with the comparison image. For example, the number of "1s" in the comparison image can be tallied to provide a block-match measure. Here again, the invention provides a performance advantage, as tallying is simpler to implement than addition.

The invention greatly reduces the amount of data that must be compared in evaluating block matches. A further, related advantage is that lower-latency operations can be used in combining data. Together, these advantages allow for dramatic speed improvements in block-match operations. This speed advantage can be exploited in a number of ways: the same number of block matches can be performed faster for greater performance, or a greater number of block matches can be performed in a given time period. Performing a greater number of matches makes it more likely that a more optimal match will be found so that greater compression effectiveness (itself a tradeoff between image quality and the degree of compression) is achieved. Of course, performance and compression effectiveness can be traded off in many other ways depending on context (fixed streaming data rate, fixed storage size, etc.).

The comparison and evaluation steps of the invention are faster versions of counterparts in the prior art. The image analysis and reduction steps of the invention do not have prior-art counterparts, and so represent offsets to the performance gains offered by the faster comparisons and evaluations. As is apparent in the detailed description below, these offsets can be minimized and amortized over block matches so that dramatic net performance gains are still achieved. These performance gains can be used to improve throughput, or applied to achieve greater compression or video quality. These and other features and advantages of the invention are apparent from the description below with reference to the following drawings.

DETAILED DESCRIPTION

Figure 1:
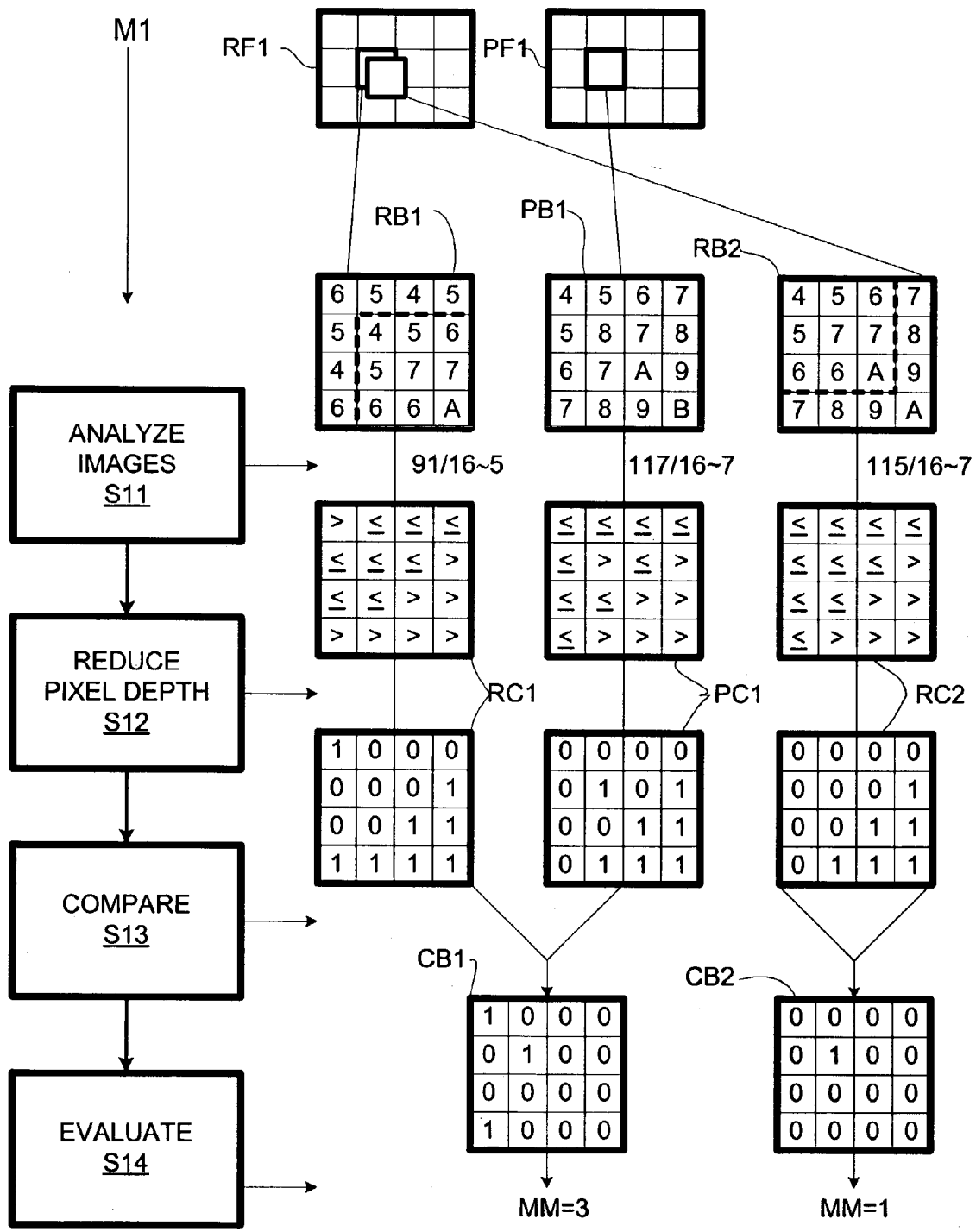
FIG. 1 is a schematic diagram of an image matching method of the invention in which 8-bit-per-pixel 4×4-pixel blocks are reduced to 1-bit-per-pixel representations prior to comparison.

An image-block matching method M1 is shown in FIG. 1 as applied to 4-bit-per pixel images using 4×4-pixel blocks. In this case, method M1 evaluates matches between a block PB1 of a predicted video frame PF1 with a block RB1 of a video reference frame RF1 and with a block RB2, also of a reference frame RF1. Each frame is a 16×12 pixel array, with each pixel having a 4-bit luminance value associated with it. Predicted frame PF1 is divided into twelve mutually exclusive 4×4-pixel blocks, including block PB1. In the course of motion estimation, block PB1 is being compared with the 117 4×4-pixel blocks (many pairs of which overlap) of reference frame RF1, including blocks RB1 and RB2. The foregoing dimensions and pixel depths are selected to simplify the illustration and explanation of the invention. In most applications, the frames, blocks, and pixel depths are greater.

At step S11, the blocks are analyzed to determine a way to reduce their pixel depths while preserving pattern information important to evaluating matches. The blocks are shown with pixel values in hexadecimal format in FIG. 1. Note that reference block RB2 is displaced one pixel down and one pixel to the right of reference block RB1. The analysis yields an average of the pixel values associated with each block: 7 for blocks PB1 and RB2, and 5 for block RB1.

"Average", as used herein, is a general term meaning any intermediate statistical value calculated from a range of values. The particular average in the example above is the characteristic of the mean, which, for present purposes, is equivalent to the mean rounded down to the nearest integer. A mean of sixteen values can be computed in binary format by adding the sixteen integer values and shifting right four bit positions. If the four least-significant bits are dropped in the process (shifted out the right side of a register), the fractional part of the average is removed and the integer remaining is the characteristic of the mean.

At step S12 of method M1, a 1-bit-per-pixel compressed block representation is computed using the original pixel data and the respective average determined in step S11. Specifically, each original pixel value is compared with the local block average: if it is less than or equal to the average, the respective pixel is assigned a "0"; if it is greater than the average, the respective pixel is assigned a "1". Note that the selection of an average as the statistic for comparison generally yields at least a rough balance between 0s and 1s, which is important for preserving pattern information in a 1-bit-per-pixel representation. By grouping equality with "less than" rather than "greater than" the results for the characteristic (i.e., the integer portion) of the mean are the same as for the mean of the pixel values of the block. Blocks PB1, RB1, and RB2 are respectively compressed to generate PC1, RC1, and RC2, each of which is a 4×4-pixel block with a 1-bit pixel depth.

At step S13, converted predicted frame PC1 is then combined using an XOR operation with each compressed reference block RC1, RC2. The combination of PC1 and RC1 is shown as CB1, while the combination of PC1 and RC2 is shown as CB2. As with compressed blocks PC1, RC1, and RC2, comparison blocks CB1 and CB2 are 4×4-pixel-blocks with 1-bit color depths. The effect of the XOR operation is such that pixels corresponding to matches are assigned 0s while mismatches are assigned 1s.

At step S14, comparison images CB1 and CB2 are evaluated to provide block-match measures for the respective reference blocks RB1 and RB2. The match measure involves tallying the number of 1s in the respective combination images. In this case, there are three is in CB1 yielding a match measure MM=3 and one 1 in CB2, yielding a match measure MM=1. A lower value for the match measure indicates fewer pixels at which mismatches are found and thus a better match. Thus, reference block RB1 is discarded in favor of reference block RB2 (which may end up being the best reference block match, or may be superceded by a block (yet to be evaluated) for which the corresponding combination block has all zeroes).

The present invention achieves performance advantages by comparing compressed blocks rather than full-precision blocks. Inherently, the compressed-block comparisons are less accurate than the full-precision comparisons. Less accurate comparisons can result in poorer compression, as more data is required to encode a poorly matched predicted block than a well-matched predicted block.

Lower matching accuracy does not inherently result in a loss of video quality, as encoding can be performed on the uncompressed video data once the block matches are determined. However, the extent of the compression can suffer. If the compression system constrains the data rate, some data may need to be discarded so that a loss of video quality can result. It is also noted that while the invention generally impairs the accuracy of the block match function, and thus compression effectiveness, the impairment is generally not perceptible and, in any event, is generally more than offset by advantages in performance. Some of the time saved by the present invention can be used to compare more blocks, increasing the chances of finding good matches, which can result in an overall improvement in compression effectiveness. So the invention does allow a flexible tradeoff of performance and compression effectiveness.

Figure 2:
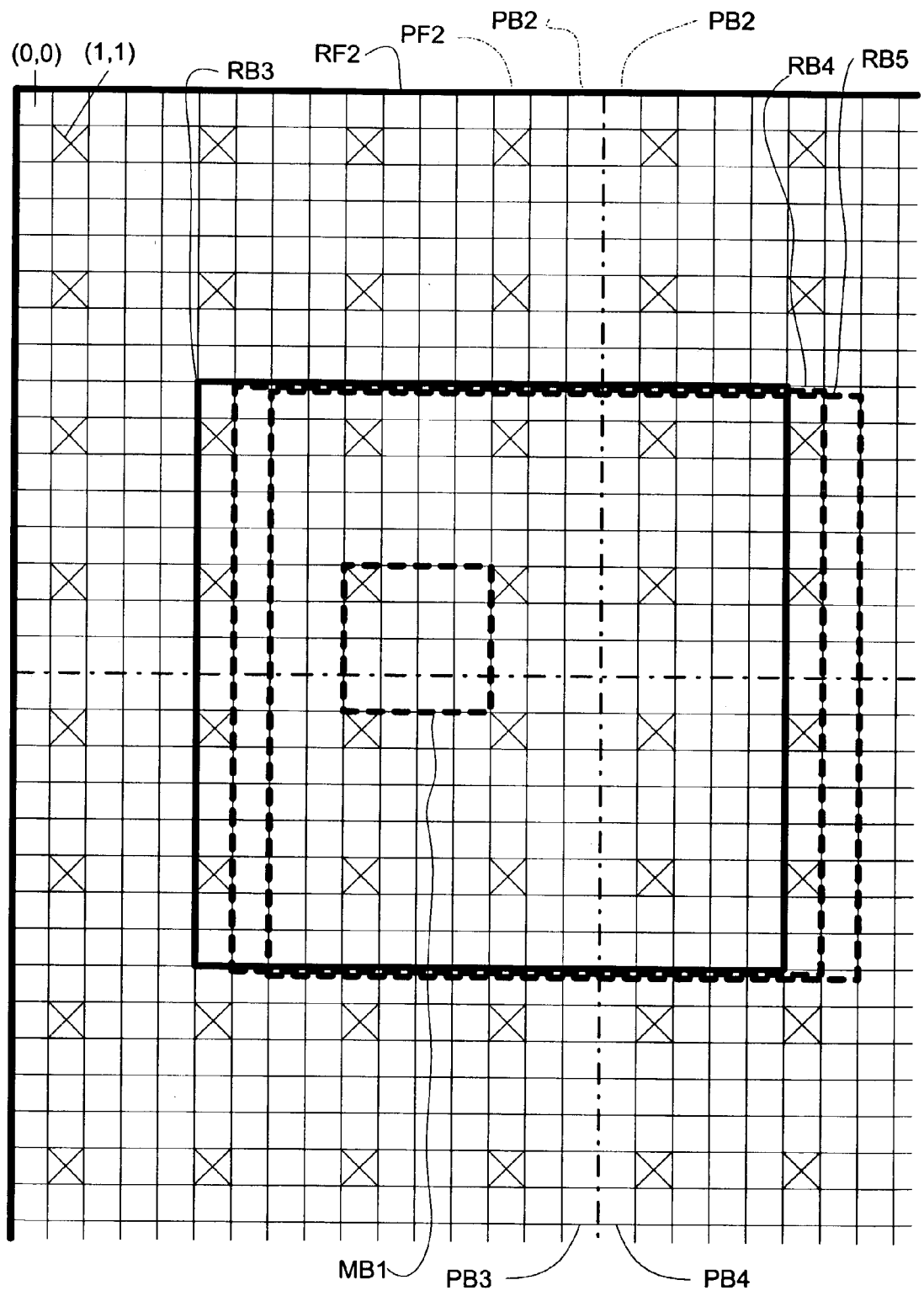
FIG. 2 is a schematic representation of part of an image showing a sub-sampling scheme used in a method of the invention in which 8-bit-per-pixel 16×16=pixel blocks are reduced to 1-bit-per-pixel representations prior to comparison.

Method M1 can also be applied to much larger images, for example, 640×480-pixel images with 8-bits of luminance per pixel, such as a predicted frame PF2 and a reference frame RF3 partially shown and superimposed in FIG. 2. Predicted frame PF2 is divided into 1200 16×16-pixel blocks, including blocks PB2, PB3, PB4, and PB5 (with boundaries indicated by dot-dash lines). Reference frame RF3 includes 290,625 reference blocks, including reference blocks RB3, RB4, and RB5. There are many more reference blocks than predicted blocks since the former are spaced in 16-pixel increments (for both columns and rows) so that they do not overlap, while the latter are displaced by 1-pixel increments.

Each of the 1200 predicted blocks of predicted frame PF2 is to be compared with the block in reference frame RF2 at the corresponding array position, as well other reference blocks displaced up to some amount of rows or columns from the predicted block position. Note that the number N of reference blocks within n rows or columns of a predicted block position is N=(2n+1)**2, so if n=10, N=441, and if n=100, N=40,401. Multiplying these values by the number of predicted blocks provides an indication of the number of comparisons (roughly, 5,000 to 50,000) per predicted block required for motion estimation for modest image sizes. Of course, these numbers are further scaled according to the number of predicted video frames being compressed. The numbers of comparisons required for high-definition images are much larger.

The larger the number of comparisons the larger the potential gain provided by the present invention. For example, 1-bit-per-pixel comparisons can be executed and evaluated much faster than 8-bit-per-pixel comparisons. On the other hand, the potential gain is offset by the computation involved in analysis and conversion to the reduced pixel depth. Therefore, preferred embodiments minimize this offset in a number of ways.

In image-analysis step S11 of method M1, as applied to large block images and block sizes, subsampling the image reduces computation. Instead of computing averages using all pixel data in the original images, averages are computed using a fraction of the image pixels. Specifically, where the upper left pixel position is the origin (0,0), the pixels (indicated by "x" in FIG. 2) at 1,1 and every fourth column and row from 1,1 are used exclusively in the image analysis. This reduces to $1/16^{th}$ the amount of data to be analyzed at step S11.

Rolling computation can further reduce the computation during image-analysis step S11. While the predicted block averages are computed independently of each other, the reference block averages are computed in a rolling fashion, taking advantage of the overlap between reference blocks. Note that reference blocks RB3 and RB4 share twelve sample points. Thus, given an average for RB3, the average for RB4 can be computed by subtracting the contribution of the subsample points in reference block RB3 but not in reference block RB4 and adding a contribution of the subsample points in reference block RB4 but not in reference block RB3. In other words, the contribution of the four subsample pixels in the first column of reference block is removed and the contribution of the four subsample pixels in the last column of reference block RB4 is added. Thus, nine values (the old average, plus the four old subsample pixels plus the four new subsample pixels) need to be considered instead of sixteen subsample pixels.

A greater computation reduction is achieved when moving from reference block RB4 to reference block RB5. These blocks share a complete set of sixteen subsample pixels; the average for block RB5 is the same as for block RB4. In fact, 16 blocks share the same set of 16 subsample pixels, so averages need to be computed for only one of each 16 reference blocks. This achieves another reduction by $1/16^{th}$ in computation requirements for computing block averages.

Further computational efficiency can be achieved in depth-reduction step S12. While each predicted pixel lies within exactly one predicted block, each reference pixel can lie within up to 256 reference blocks. Instead of converting each reference pixel once per including block, method M1 converts each reference pixel once based on the average associated with the block for which that pixel is closest to the center. Due to subsampling, all pixels within a 4×4-pixel mini-block, e.g., MB1, are compared with the same average. The entire reference frame (like the predicted frame) is converted only once. This reduces the computation requirements by about two orders of magnitude.

Block comparison step S13 then involves block matching 1-bit-per-pixel blocks (instead of 8-bit-per-pixel blocks). Each block can be represented in four 64-bit registers, and two blocks can be XORed in four 2-operand-register operations, with a comparison image also represented in four 64-bit registers. Match-evaluation step S14 simply involves tallying the number of 1s in the four result registers. Where an XOR+POPCNT+AC (XOR and population count and accumulate) instruction is used, only four instructions total (excluding load instructions) are required to implement comparison step S13 and match-evaluation step S14.

The invention provides for many variations of method M1 as applied to large images and blocks. The subsampling can be more or less sparse—for example, instead of every fourth row and column, subsampling can occur at every other row and column. Also, instead of being uniform over the image, a non-uniform subsampling distribution can be used. Furthermore, the subsampling can change or "move" with the block under consideration, rather than be fixed relative to the image.

In computing averages, there can be one average per block, or one average per pixel, or one average per group of pixels (e.g., miniblock). If one average is to be computed per pixel, it is possible to select an odd-sized block having that pixel at its center. For example, a 17×17-pixel block with its first, fifth, ninth, thirteenth, and $17^{th}$ rows and columns used to define 25 subsample points for computing an average for its center pixel. Such an approach has been shown to yield effective compression but computational requirements are much greater. Not only are more (25 versus 16) pixel values involved, but since a power of two boundary is crossed, twice as many registers are used to represent an image. Also, since completely different sets of subsample pixels are used to calculate averages for adjacent pixels, it is difficult to take advantage of rolling computations.

In computing reference block averages, the invention provides that some reference blocks can "adopt" averages from other blocks. For example, averages can be computed for reference blocks that have the same positions as predicted blocks. Other reference blocks can be assigned the average for the closest reference block for which an average has been calculated. A more extreme approach to adoption assigns the average for a predicted block to reference blocks at or near its position.

In method M1, pixel-depth is reduced to 1-bit-per-pixel. Alternatively, the reduction can be to two or more bits per pixel. For example, the image analysis can divide the pixel values associated with a block into four groups, each of which is assigned a two-bit value. Alternatively, more granulated groupings can be represented using more than two bits per pixel.

The sufficiency of the XOR operation in combining images is clearest when the images are 1-bit per pixel. Unlike cases in which more bits are used per pixel, all bits have the same significance. However, the invention also provides for XORing and/or tallying when the images combined have depths of greater than 1-bit-per-pixel, despite the fact that this means that existing differences in bit significance are ignored. For example, two-bit values can be used to distinguish four ranges of pixel values. Upon XORing and tallying, the middle two ranges are effectively merged so that only three ranges are distinguished.

When the pixel depth is reduced to three or more bits, ignoring bit significance while XORing and tallying merges pixel values in a non-contiguous (and correspondingly non-intuitive) manner. Surprisingly, the results can still be used effectively for video compression.

The invention provides for reductions to integer or non-integer pixel depths. Fractional bit depths can be achieved by assigning one compressed pixel value to more than one pixel, e.g., to a 2×2-pixel super-pixel. This yields a pixel depth of 0.25 bits per pixel. In addition, the invention provides for reductions to non-integer bit depths greater than 1, as in the following example.

Figure 3:
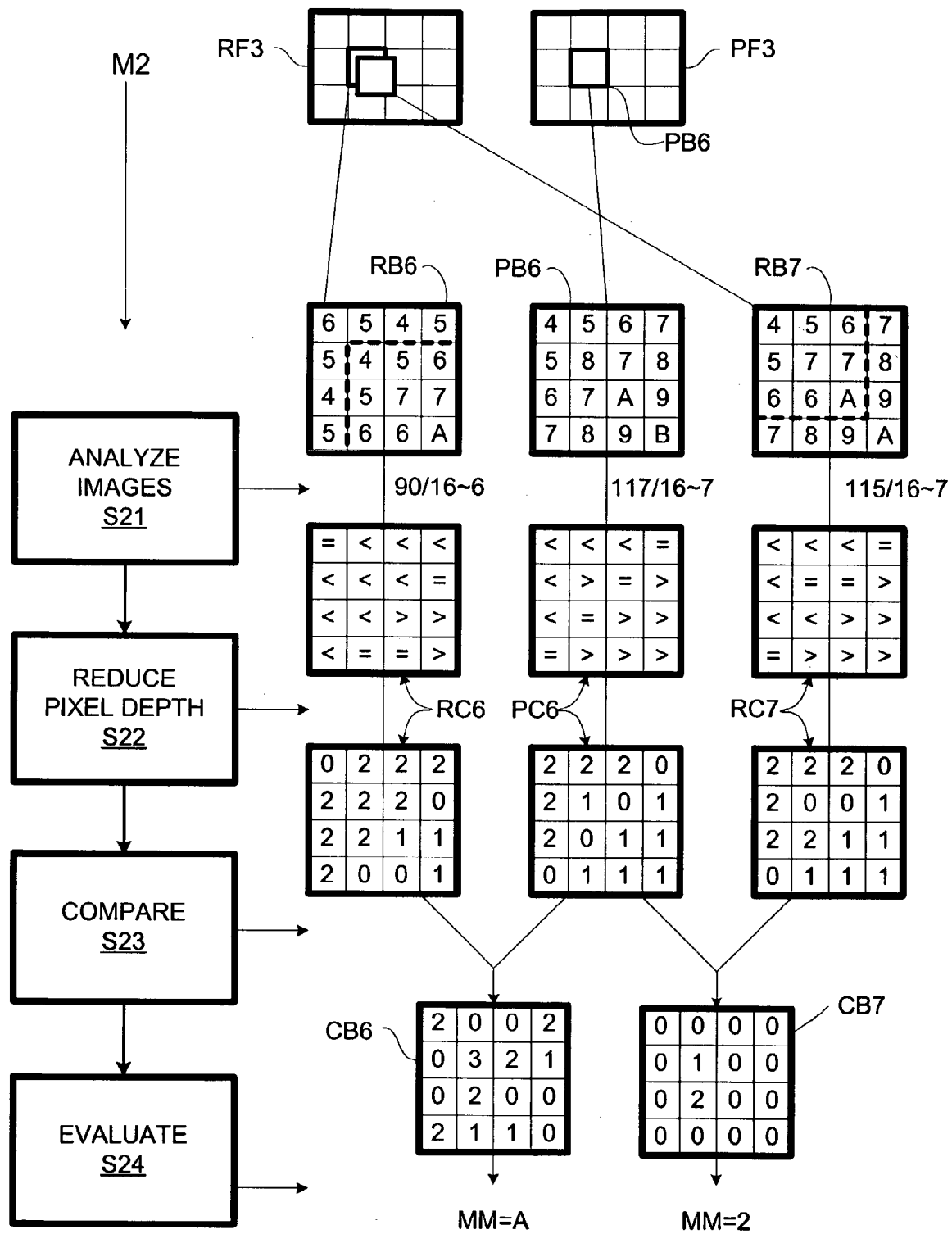
FIG. 3 is a schematic representation of an image-matching method of the invention in which 8-bit-per-pixel 4×4 blocks are reduced to 2-bit representations prior to comparison.

In a method M2, represented in FIG. 3, reference blocks RB6 and RB7 of a reference frame RF3 are evaluated for matches with a predicted block PB6 of a predicted frame PF3. Block averages are computed at a step S21. However, instead of distinguishing two groups (less-than-or-equal-to versus greater-than) of pixel values, three groups of pixel values are distinguished: less-than versus equal-to versus greater-than. Since three groups are distinguished, the actual pixel depth is $\log_2(3) \sim 1.58 \sim 1.6$. This above-unity non-integer value offers a potentially increased computation efficiency relative to reductions to 2-bits-per-pixel as five 1.6-bit values can be represented in eight bits as opposed to four 2-bit values. In more esoteric environments with trinary representations, the depth reduction would be to 1-trit-per-pixel. However, the invention provides advantages for the three-way grouping even without these exotic approaches.

In method M2, the three possible groups are assigned to respective ones of three of the four possible 2-bit values: a 00 is assigned for pixel values equal to the computed average (characteristic of the mean) for the block; 01 is assigned for pixel values greater than the average; and 10 is assigned for pixel values less than the average. Alternatively, 00 can correspond to a middle range of values. "11" is not used.

Since the pixel representation is 2-bits-per-pixel instead of 1-bit-per-pixel (as in method M1), a 64-bit register can only represent 32 pixels, instead of 64. Thus, one block consumes eight 64-bit registers. Thus, there are eight 64-bit comparisons required at step S23. The comparisons are obtained by bit-wise XORing respective 64-bit operands, ignoring significance. Accordingly, 00 in the combination image represents a match for that pixel; 01 and 10 indicate that one pixel was 00 and the other was not (a minor mismatch), and a 11 indicates that one pixel was negative and the other positive (a major mismatch), as represented in the following table:

| Reference Pixel | Predicted Pixel | Comparison Pixel |
| --- | --- | --- |
| 00 | 00 | 00 |
| 00 | 01 | 01 |
| 00 | 10 | 10 |
| 01 | 00 | 01 |
| 01 | 01 | 00 |
| 01 | 10 | 11 |
| 10 | 00 | 10 |
| 10 | 01 | 11 |
| 10 | 10 | 00 |

At step S24, the 1s in the combined image are tallied. Matches result in 0s, minor mismatches in 1s, and major mismatches in 2s. In effect, by treating 01 and 10 the same, no difference is accorded between: 1) a mismatch between a zero and a less than, and 2) a mismatch between a zero and a greater than. Appropriately, negative and positive deviations from equality are treated as equivalent mismatches just as is done with more computation in the prior art using the absolute value of the differences.

Figure 4:
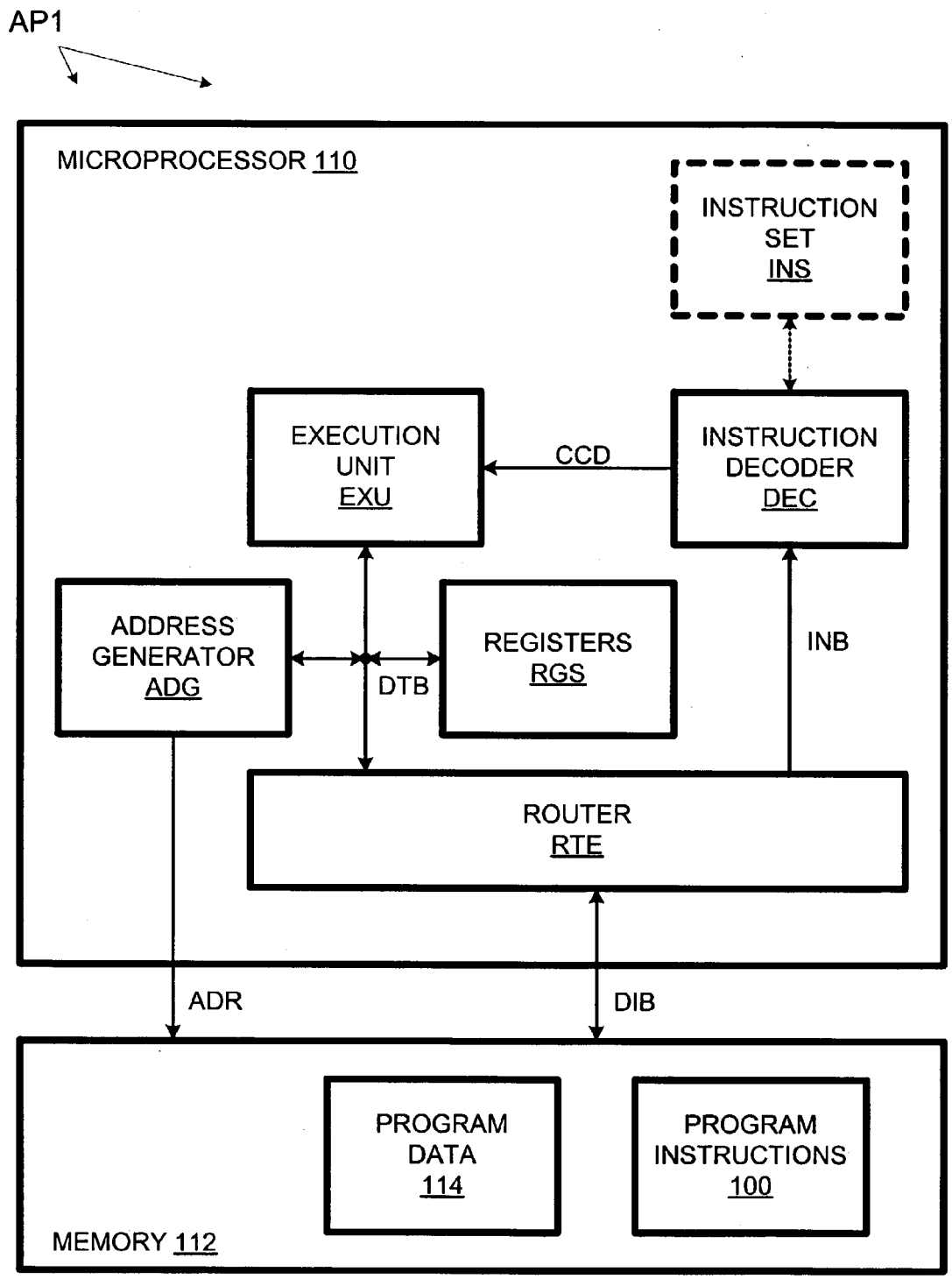
FIG. 4 is a block diagram of a computer system for implementing the methods of the foregoing figures.

Methods of the invention are implemented as a program 100 of instructions on a computer system, which includes a microprocessor 110 and memory 112, as shown in FIG. 4. The contents of memory 112 include program data 114 and instructions constituting program 100. Microprocessor 110 includes an execution unit EXU, an instruction decoder DEC, registers RGS, an address generator ADG, and a router RTE.

Generally, execution unit EXU performs operations on data 114 in accordance with program 100. To this end, execution unit EXU can command (using control lines ancillary to internal data bus DTB) address generator ADG to generate the address of the next instruction or data required along address bus ADR. Memory 112 responds by supplying the contents stored at the requested address along data and instruction bus DIB.

As determined by indicators received from execution unit EXU along indicator lines ancillary to internal data bus DTB, router RTE routes instructions to instruction decoder DEC via instruction bus INB and data along internal data bus DTB. The decoded instructions are provided to execution unit EXU via control lines CCD. Data is typically transferred in and out of registers RGS according to the instructions.

Associated with microprocessor 110 is an instruction set of instructions INS that can be decoded by instruction decoder DEC and executed by execution unit EXU. Program 100 is an ordered set of instructions selected from instruction set INS. For expository purposes, microprocessor 110, its instruction set INS and program 100 provides examples of all the instructions described below.

The precise gains achieved by a method of the invention depend on the microprocessor used to implement the method and, more specifically, on the instruction set associated with that microprocessor. Three cases can be distinguished: 1) instructions available on commercial processors; 2) custom instructions that could easily be designed into a general-purpose processor; and 3) custom instructions that would be more likely to be implemented in the context of an application-specific processor. In particular, existing and potential general-purpose processors tend to be limited to one- and two-operand instructions, while three-operand instructions would be most likely realized in an application-specific processor.

For example, using a commercially available "Itanium" instruction set on data reduced to 1-bit-per-pixel, 64 pixels can be handled in three instructions.

XOR r1, r2, r3: r3=bit-wise exclusive-or of the 64 bits in r1 with the 64 bits in r2.

POPCNT r1,r3: r3=(number of "1"-valued bits in r1).

ADD r1, r2, r3: r3=r1+r2.

This works out to 3 cycles per 64 pixel pairs or ⅜ cycle per 8 pixel pairs. This compares with a prior-art method using PSAD r1,r2,r3: r3=sum of the absolute values of the differences of 8 values in r2 and r3.

ADD r1,r2,r3:

which combines eight pairs of pixels in two cycles. The invention provides a speed up of 2*8/3=5.33 times.

Whether this gain can be achieved depends in part on processor-specific characteristics. For example, in the Itanium processor, the following restrictions adversely affect the gain offered by the invention.

1) a two-cycle latency for every multimedia instruction (simple or hard).
2) a 3-cycle penalty going from an integer to a multimedia instruction.
3) a 4-cycle penalty going form a multimedia instruction to an integer instruction.

However, such penalties may mitigated by properly software pipelining instructions, e.g., XORj XORj—
XORj XORj PADDk PADDk
LDi LDi PADDk PADDk
LDi LDi POPCNTj POPCNTj
POPCNTj POPCNTj where the subscripts i, j, k refer to successive iterations. PADD instructions are used instead of ADD to avoid the 4-cycle latency going from a multimedia instruction, POPCNT, to an integer instruction ADD. In the above loop, every dependent instruction is three cycles away. Also, the load instruction is considered in this case for the inner loop. This gives 5 cycles for 256 pixel pairs (a whole macroblock). The only change to the existing datapaths in the Itanium processor to implement this example of the invention would be one more POPCNT unit.

However, further gains are achievable by using novel instructions that combine two or three of the XOR, Population Count, and Accumulate operations. For example, a POPCNTAC ("population count and accumulate") instruction can be used for a two-cycle loop.

XOR r1,r2,r3
POPCNTAC r1,r2,r3.

The full sequence:
XOR R1=S0 XOR T0
POPCNTAC R2=(population count for R1)+R0
XOR R2=S1 XOR T1
POPCNTAC R3=(population count for R2)+R1
XOR R1=S0 XOR T0
POPCNTAC R4=(population count for R3)+R2
XOR R1=S0 XOR T0
POPCNTAC R5=(population count for R4)+R3.

This works out to 2 cycles per 64 pixel pairs or 2/8/cycles per 8 pixel pairs. Compared to the prior-art, this is a speed up of 2*8/2=8 times. Again, there is overhead in preprocessing frames.

Alternatively, the XOR and population count operations can be combined in a XORPOPCNT instruction. In that case, a two-cycle loop would be:

XORPOPCNT r1,r2,r3
AC r1,r2,r3

The gain here is comparable to the case where the POPCNT and AC instructions are combined.

It is also possible to combine the XOR operation and POPCNTAC operations into a single instruction PSXOR. This works out to 64 pixel pairs or ⅛ cycle per eight pixel pairs. Compared to the prior art, the speed up per eight pixel pairs in the inner loop is 2*8/1=16 times. However, three operands are required, so this approach best suited for application specific processors.

The invention provides for other embodiments with different original pixel depths, different converted pixel depths, different statistics (e.g., median, mode, variance) resulting from image analysis, different image and block sizes, different functions for combining compressed images, and different methods of evaluating the compressed images to obtain a match measure. The comparison with the image analysis results can apply different relations, e.g., typical binary relational operators such as $<, >, =, \leq, \geq$, or more complex relationships, e.g., whether the original pixel falls into one of N ranges of values (as you described earlier), where N is greater than 2. These and other variations upon and modifications to the described embodiments are provided by the present invention, the scope of which is defined by the following claims.

What is claimed is:

1. A method of selecting a best match for a target image block from a set of reference image blocks, each of said target and reference image blocks being defined by original pixel values having a first pixel depth assigned to pixel positions of said subject images, said method comprising:

converting said original pixel values to reduced-depth pixel values having a second pixel depth less than said first pixel depth to yield compressed target and reference image blocks;

generating a match measure for each of said compressed reference image blocks by bit-wise comparison of said compressed target image block with each of said compressed reference image blocks; and selecting the reference block having a match measure indicating a best match with said compressed target image block.

2. A method as recited in claim 1 wherein said second pixel depth is one bit per one or more pixels.

3. A method as recited in claim 2 wherein all of said reference blocks are part of the same incorporating image.

4. A method as recited in claim 3 wherein said converting step involves:

analyzing said incorporating images to generate analysis results; and converting said original pixel values to said reduced-depth converted pixel values as a function of said analysis results.

5. A method of evaluating a match between subject images defined by original pixel values having a first pixel depth assigned to pixel positions of said subject images, each of said subject images being a contiguous block of pixels of a respective incorporating image, said method comprising:

converting said original pixel values to reduced-depth pixel values having a second pixel depth being not more than half said first pixel depth to yield compressed images, said converting involving analyzing said incorporating images to generate analysis results, said converting also involving converting said original pixel values to said reduced-depth converted pixel values as a function of said analysis results; and generating a match measure for said compressed images as a function of said reduced-depth pixel values, said generating involving combining said compressed images to yield a comparison image, said generating also involving evaluating said comparison image to determine a degree of match between said subject images.

6. A method as recited in claim 5 wherein said second pixel depth is 1.

7. A method as recited in claim 5 wherein said second pixel depth is an integer greater than or equal to 2.

8. A method as recited in claim 5 wherein said second pixel depth is a non-integer less than 1.

9. A method as recited in claim 5 wherein said second pixel depth is a non-integer greater than 1.

10. A method as recited in claim 5 wherein said image analysis yields an average pixel value for at least one of said images, and said converting involves comparing at least one of said original pixel values with said average.

11. A method as recited in claim 10 wherein said average is a function of original pixel values associated with less than half of the pixels of one of said images.

12. A method as recited in claim 10 wherein said average value is a function of pixel values associated with a discontiguous set of the pixels in one of said images.

13. A method as recited in claim 5 wherein said image analysis divides said original pixel values into groups, said comparison assigning values to pixels as a function of the group to which its original pixel value belongs.

14. A method as recited in claim 5 wherein said combining involves a bit-wise combination of said converted images.

15. A method as recited in claim 5 wherein said evaluating involves tallying bit values of said comparison image.

* * * * *